United States Patent [19]
Kamata et al.

[11] Patent Number: 4,690,514
[45] Date of Patent: Sep. 1, 1987

[54] LENS MOVING DEVICE

[75] Inventors: Shigeru Kamata, Tokyo; Toshimi Iizuka, Kanagawa, both of Japan

[73] Assignee: Canon Kabushiki Kaisha, Tokyo, Japan

[21] Appl. No.: 790,110

[22] Filed: Oct. 22, 1985

[30] Foreign Application Priority Data

Oct. 23, 1984 [JP] Japan .................. 59-221194

[51] Int. Cl.⁴ .............................................. G02B 7/10
[52] U.S. Cl. ............................................... 350/429
[58] Field of Search ............................. 350/429, 430

[56] References Cited

U.S. PATENT DOCUMENTS 4,272,160  6/1981  Uesugi ....................... 350/429
4,273,423  6/1981  Uesugi .
4,610,512  9/1986  Kamata .................... 350/429

Primary Examiner—John K. Corbin
Assistant Examiner—Loha Ben
Attorney, Agent, or Firm—Toren, McGeady & Associates

[57] ABSTRACT

A lens moving device having a longitudinally elongated guide slot in a sleeve axially movable along with an actuator, and a protuberant lug formed in a body tube and extending into the guide slot, with an engagement member fitted in both a penetration hole provided in the body tube and the guide slot to thereby assure operative connection between the protuberant lug and the slot over the entire range of axial movement of the movable sleeve.

6 Claims, 5 Drawing Figures

4,690,514

LENS MOVING DEVICE

BACKGROUND OF THE INVENTION

1. Field of the Invention

This invention relates to a lens moving device, and more particularly, to a moving device for a zoom lens.

2. Description of the Prior Art

The lens moving device in a lens mounting mechanism, having a body tube with a longitudinally elongated guide slot, an operating member axially movable for carrying out zooming, an axially movable sleeve drivingly connected to the operating member, and a member for holding an optical lens with cam-pin means for moving the lens holding member in response to movement of the sleeve, is shown in U.S. Pat. No. 4,273,423.

In the above-described mounting mechanism, to limit the range of axial movement of the sleeve, use may be made of a key member movably fitted in the guide slot of the body tube and fixedly secured to the movable sleeve.

In this case, it is unavoidable that as the operating member or the zoom ring, is driven to move by a strong force, when it reaches the terminal end, a large shock is given to that key member, and that it bears a load to restraining the movable sleeve from rotation about the optical axis.

Further, recently, the trend of using synthetic resin for making up some of the constituent parts of the lens mounting mechanism by molding techniques, with advantages that mass production is facilitated, the production cost is reduced, the quality is uniformed from item to item, and the weight of the lens mounting is reduced, is becoming prevalent. This is valid in the case of the above-described lens mounting mechanism.

When the molding technique is applied to the above-described key member, body tube and movable sleeve, however, shortcomings, such as loss in the precision accuracy of the dimensions of each part and large decrease in the physical strength, are encountered.

SUMMARY OF THE INVENTION

An object of the present invention is to provide a lens moving device whose constituent parts for controlling the movement of a lens are made of resin material, with an advantage arising from the use of the molding techniques, while nevertheless permitting a great increase in the accuracy of assembly between parts, by using a novel form of the above-described body tube and movable sleeve to be achieved for the required degree of accuracy of control for the movement of the lens.

A second object of the present invention is to provide a structure of construction of molded resin parts which can obviate the necessity for the position adjusting means to take the form of metal screws when the constituent parts, particularly the body tube and the movable sleeve, are assembled, but to take a form of an engagement member made of resin material, with an advantage of utilizing its elastic properties in assuring the possibility of obtaining the required degree of accuracy of operation of one movable member with respect to another.

DETAILED DESCRIPTION OF THE PREFERRED EMBODIMENT

Figure 1:
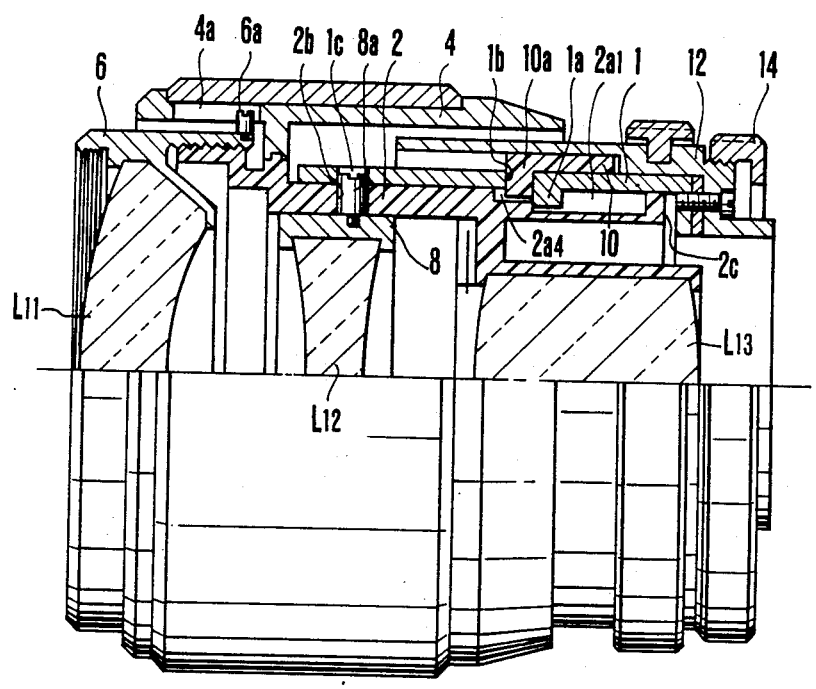
FIGS. 1 and 2 are longitudinal section views of an embodiment of a lens moving device according to the present invention, applied to a zoom lens mounting when focused to the minimum object distance and an infinitely distant object, respectively.
Figure 2:
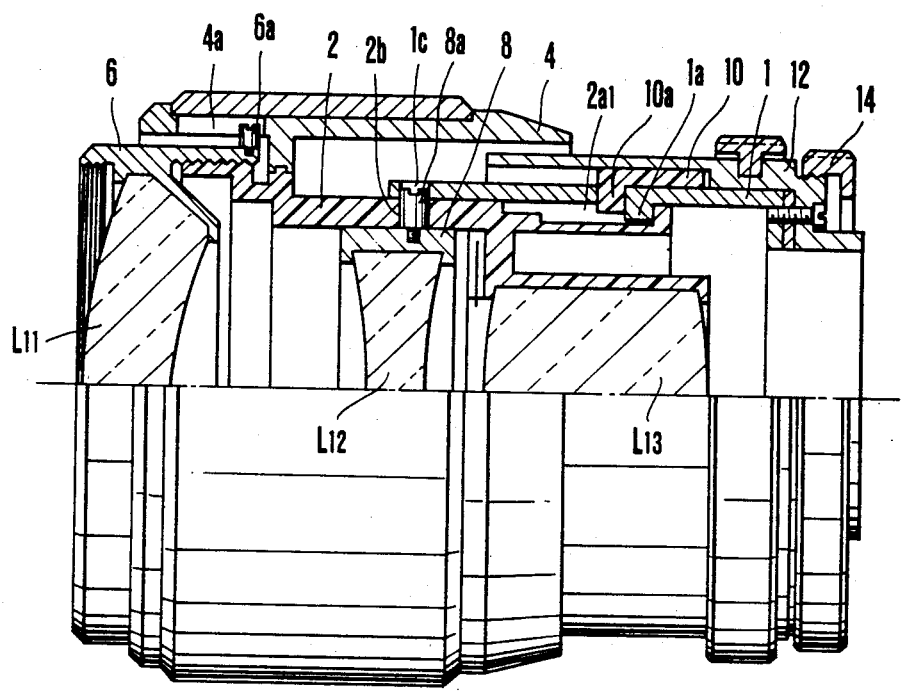
Figure 3:
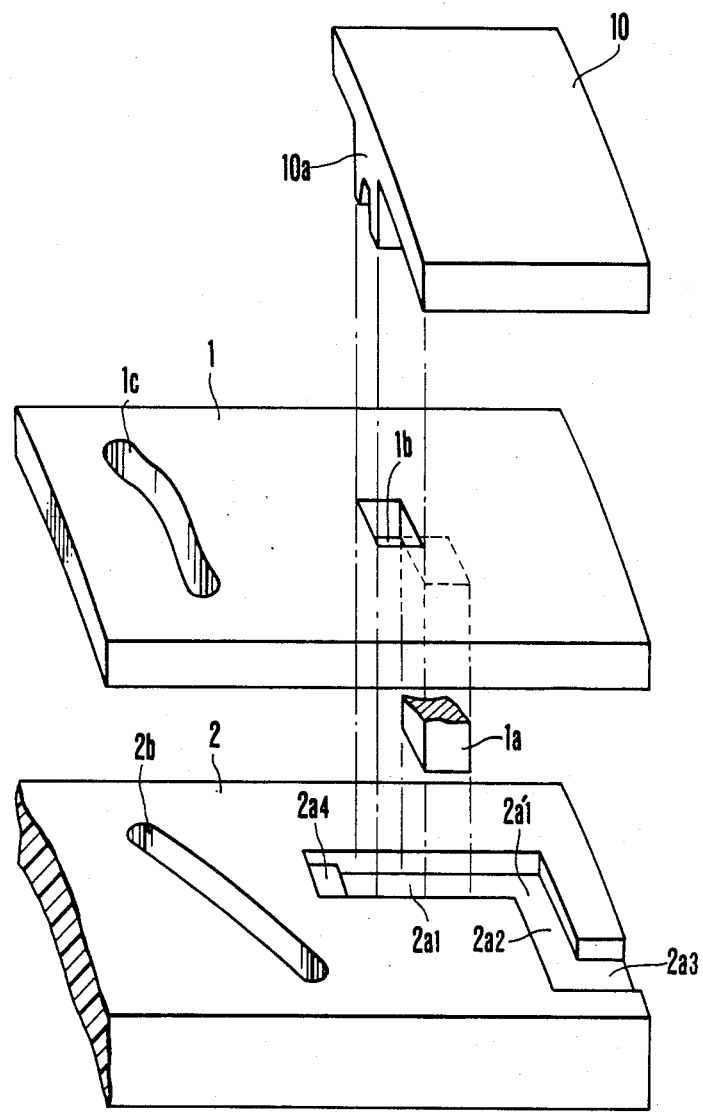
FIG. 3 is an exploded perspective view of the main parts of the lens moving device.

In FIGS. 1 to 3, there is shown one embodiment of the lens moving device according to the present invention. A body tube 1 is provided with a radial protuberance 1a on the inner surface thereof and further with a penetration hole 1b and a camming slot 1c. A sleeve 2 is movably fitted in the inner diameter of the body tube 1, and has a longitudinally elongated first guide slot 2a1 and a camming slot 2b.

The first guide slot 2a 1 is provided with a second guide slot 2a2 of circumferential direction contiguous to one end portion of the first guide slot 2a 1 and a third guide slot 2a3 of longitudinal direction contiguous to the opposite end portion of the second guide slot 2a2 and extending, at an opposite end, to the end of the movable sleeve 2.

The camming slot 2b is arranged and oriented to cross the camming slot 1c of the body tube 1.

The length of the longitudinally elongated first guide slot 2a1 defines the range of axial movement of a lens to be described later, so that both ends of the first guide slot 2a1 function as stops for the lens.

An operating member 4 is arranged to be rotatable relative to the movable sleeve 2 by a helicoid coupling means having a minute lead, or by a connection of a circumferential groove with a projection, and also to axially move as a unit with the latter. Further, the operating member 4 is drivingly connected to a holding member 6, containing a first lens L11, by an axial slot 4a and a pin 6a connection.

The movable sleeve 2 and the first lens holding member 6 are helicoid-connected to each other.

A second holding member 8, containing a second lens L12, is movably fitted in the inner diameter of the sleeve 2 and has a radial pin 8a extending into a cross point of the camming slots 1c and 2b.

A third lens L13 is fixedly secured to the movable sleeve 2.

An engagement member 10 has a radial projection 10a extending inwardly of the inner surface thereof and positioned in the penetration hole 1b of the body tube 1.

A mount member 12 is fixedly secured to the body tube 1 by a screw fastener, and a tightening ring 14 is rotatable relative to the mount member 12 and is engageable with a coupling member (not shown) on a camera housing.

At the front end of the longitudinally elongated first guide slot 2a1 there is shown an escapement groove 2a4 for avoiding mechanical interference with the projection 10a of the engagement member 10.

In the above-described constituent parts, of the body tube 1, the movable sleeve 2 and the lens holding members 6 and 8, it is possible for each lens holding member 6, 8 and the body tube 1 to be made of metal material by cutting and pressing means. Also, the movable sleeve 2 is possibly constructed with a number of parts with the use of screw fasteners to the illustrated shape.

To construct the movable sleeve 2 from a helicoid portion 2A, a main body portion 2B, and a lens holding portion 2C, is, however, not preferable from the reason of the part control, the accuracy security on the part assembly line, and the increase in the number of steps of the assembling process. It is therefore desirable to make the movable sleeve 2 in one operation by using resin material with molding means.

The engagement member 10 also can be made of metal by fixedly securing the fork-like projection 10a to an arcuate plate by screw fasteners. However, it is better to use resin material with molding techniques.

For the foregoing reasons, in the mechanism of FIGS. 1 to 3, it is better to use resin material for making at least the movable sleeve 2 and the engagement member 10.

To assemble the lens mounting of the structure described above, when the movable sleeve 2 is to be brought into the interior of the body tube 1, the operator first puts the third guide slot 2a3 of the movable sleeve 2 in axial alignment with the protuberance 1a of the body tube 1, then pushes the sleeve 2 until the protuberance 1a is aligned with the second guide slot 2a2, then turns the sleeve 2 until the protuberance 1a enters the longitudinally elongated first guide slot 2a1. The axial length of the first guide slot 2a1 corresponds to the distance between the wide angle and telephoto positions of the operating member 4, as both ends of the first guide slot 2a1 function as stops for the protuberance 1a. Because the three guide slots 2a1, 2a2, and 2a3 of the movable sleeve 2 are arranged to be similar to the letter "L", there is no longer any need to use separate stops in combination with screw fasteners therefor.

After the protuberance 1a has entered the longitudinally elongated first guide slot 2a1, the engagement member 10 is positioned above the body tube 1 while the fork-like projection 10a is inserted into both the penetration hole 1b and the guide slot 2a1.

With the engagement member 10 thus assembled, even when the protuberance 1a of the body tube 1 comes to the rear end 2a'1 of the guide slot 2a 1 the movable sleeve 2 is hindered from rotation relative to the body tube 1, and is allowed to only axially move.

The operation of the lens mounting mechanism of FIGS. 1 to 3 is as follows:

When the operating member 4 is turned, the first lens L11 only is axially moved by the slot 4a-and-pin 6a connection; thereby focusing is performed.

For zooming purposes, the operator pushes or pulls the operating member 4 axially. Thereby, the movable sleeve 2 is moved along with the operating member 4 relative to the body tube 1.

The range of movement of the operating member 4, or the range of operation between the shortest and longest focal length positions, is the distance the protuberance 1a moves from one end of the longitudinally elongated first guide slot 2a1 to another.

Responsive to axial movement of the movable sleeve 2, the second lens holding member 8 moves to follow movement of the cross point of the camming slot 1C of the body tube 1 and the camming slot 2b of the movable sleeve 2. By axially moving the operating member 4, therefore, the unit of the first and third lenses L11 and L13 and the second lens L12 are moved in differential relation to effect zooming.

In the embodiment of FIGS. 1 to 3, axial movement of the movable sleeve 2, due to the zooming actuation of the operating member 4, is stopped by either end of the longitudinal first guide slot 2a1 abutting the protuberance 1a. In the case when the body tube 1 and its protuberance 1a are made up of resin material by molding techniques, therefore, there is a high possibility of occurrence of breaking the protuberance 1a when the operating member 4 is rapidly zoomed to the wide angle or telephoto end with a large shock.

Figure 4:
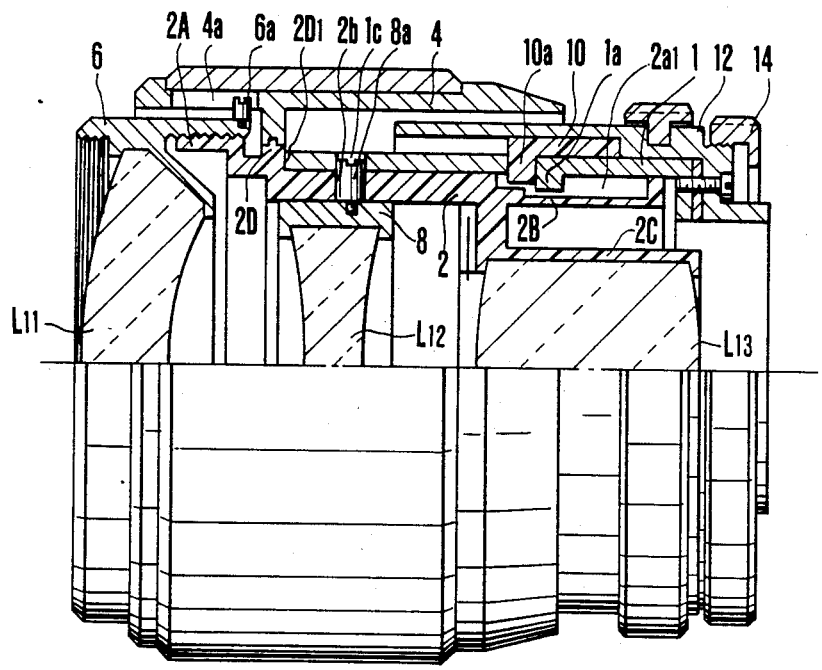
FIG. 4 is a longitudinal section view of an example of a variation of the lens moving device in the zoom lens mounting.

FIG. 4 illustrates a measure for preventing the protuberance 1a from being broken, wherein the shortest focal length side end of the longitudinal guide slot 2a1 is excessively extended so that when zoomed to the shortest focal length position, the protuberance 1a is not struck by that end of the longitudinal first guide slot 2a1. Instead, the movable sleeve 2 is provided with a flanged portion 2D at the boundary between the helicoid portion 2A and the main body 2B, to engage with the operating member 4 so that when zoomed to the shortest focal length position, the rear surface 2D1 of the flange 2D abuts the front end of the body tube 1.

Figure 5:
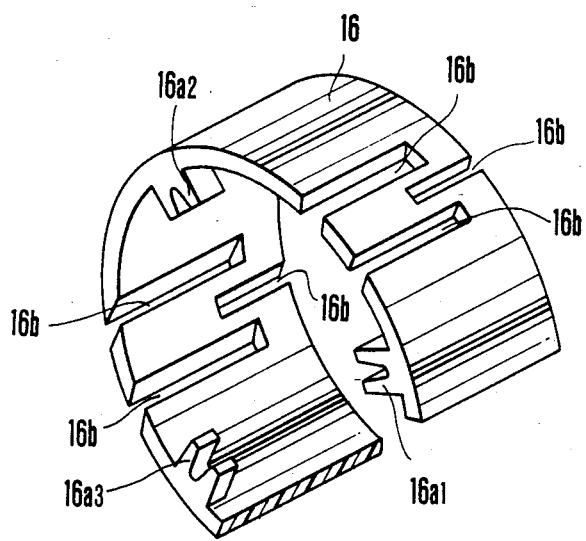
FIG. 5 is a perspective view illustrating an example of a modification of the engagement member in the lens moving device.

FIG. 5 illustrates a better form of the above-described engagement member when it is made of resin material.

In the lens mounting of FIGS. 1 to 4, as the longitudinal first guide slot 2a1, the protuberance 1a, and the fork projection 10a of the engagement member 10, each are three in number at an interval of, for example, 120° so as to maintain good balance, if the three engagement members 10 are made up in separation, the number of parts is increased objectionably. FIG. 5 illustrates an example of construction of a plurality of engagement members as a single unit. In FIG. 5, an arcuate band plate member 16 of resin material, having a relatively large elasticity, is provided with three fork-like projections 16a1, 16a2 and 16a3 on an inner surface thereof, and with three alternating slits 16b in the ends of the band plate 16 between the successive two projections so that the expansibility is increased. The band plate member 16 of such construction is put on the body tube 1 while the three projections are inserted into respective penetration holes 1b and also respective longitudinal first guide slots 2a1 of the movable sleeve 2. By adjusting the top of each of the fork-like projections 16a1 16a2 and 16a3 to a slightly wider size than the width of the longitudinal guide slot 2a 1, in view of the utilization of the elasticity of the forked portion, engagement into the penetration holes 1b and the guide slots 2a1 can be performed in a good way.

The slits 16b of the band plate member 16 allow the band plate portion of high expansibility to correct, more or less, errors of the dimensions between the engagement portions of the parts.

As has been described above, the present invention is to provide for the movable sleeve 2 with a longitudinal first guide slot 2a1 and for the body tube 1 with a protuberance 1a on the inner surface thereof to engage in the first guide slot 2a 1 whereby an engagement member 10 having projections 10a each extending into both a penetration hole 1b provided in the body tube 1 and the first guide slot 2a1 is put on the outer surface of the body tube 1, with an advantage that the backlash between the body tube 1 and the movable sleeve 2 in directions about the optical axis can be limited to a minimum, contributing to an increase in the accuracy of movement of the lens.

Particularly, with the use of resin material in making the above-described engagement member 10, by utilizing the elasticity of the material when the projections 10a are inserted into the penetration holes 1b and the longitudinal first guide slots 2a1, looseness between these parts can be limited to a minimum.

Further, by the use of resin material in making the movable sleeve 2, the present invention has additional advantages that even when the longitudinal first guide slot 2a1, lateral second guide slot 2a2 and longitudinal third guide slot 2a3 are contiguously formed to each other, no increase in cost is incurred in production, and that in the assembling operation of the body tube 1 and the movable sleeve 2, as has been described above, there is no need to introduce a step of fixedly securing stop members for preventing the movable sleeve 2 from straying from the axial path of movement to the body tube by screw fasteners.

What is claimed is:

1. A lens moving device comprising:
   (a) an optical lens contributing to a zooming function and a lens holder holding said lens;
   (b) a body tube, said body tube being provided with a penetration hole and a first engaging portion on an inner surface thereof;
   (c) operating means;
   (d) a movable sleeve fitted in said body tube and arranged, upon actuation of said operating means, to move, said movable sleeve having a guide groove or slot engaging with said first engaging portion of said body tube; and
   (e) an engagement member, said engagement member being positioned outside of said body tube and having a second engaging portion fitted in both said penetration hole of said body tube and said guide groove or slot of said movable sleeve.

2. A lens moving device comprising:
   (a) a zoom lens contributing to a zooming function and a holding member holding said lens;
   (b) a body tube having a penetration hole and a protuberance on an inner surface thereof;
   (c) an actuator member axially movable for zooming purposes;
   (d) a movable sleeve drivenly connected to said actuator member to move axially, said movable sleeve being provided with a longitudinally elongated guide slot into which said protuberance extends;
   (e) means responsive to zooming operation of said actuator member for moving said holding member; and
   (f) an engagement member positioned outside of said body tube and extending through said penetration hole into said longitudinally elongated guide slot.

3. A device according to claim 1 or 2, wherein said engagement member has a plate portion positioned on an outer periphery of said body tube and an engaging portion extending radially inwardly of said plate portion into both said penetration hole and said guide groove or slot, whereby said engaging portion is given an elasticity such that when it enters both said penetration hole and said guide groove or slot, it can deform.

4. A device according to claim 3, wherein said penetration hole, said guide groove or slot and said engaging portion are each plural in number around an optical axis; and said engagement member is formed in a band-like shape, and said engaging portions in said penetration holes and said guide grooves or slots have fork-like branched tops.

5. A device according to claim 4, wherein said band-like engagement member is provided with longitudinal slits in a part of the circumferential direction so that said engagement member can expand in the circumferential direction.

6. A device according to claim 1 or 2, wherein said guide groove or slot of said movable sleeve comprises an axial groove or slot, a lateral groove or slot contiguous to the axial groove or slot, and a longitudinal groove or slot contiguous to said lateral groove or slot and extending to an end of said movable sleeve.

* * * * *